United States Patent [19]

Turner

[11] Patent Number: 4,816,270

[45] Date of Patent: Mar. 28, 1989

[54] PROCESSED PEANUTS AND METHOD OF PRODUCING THE SAME

[76] Inventor: Willie A. Turner, 5121 Harriet St., Savannah, Ga. 31405

[21] Appl. No.: 75,765

[22] Filed: Jul. 20, 1987

[51] Int. Cl.⁴ .............................................. A23L 1/25
[52] U.S. Cl. .................................... 426/243; 426/632; 426/242; 426/456
[58] Field of Search ............... 426/632, 617, 241, 242, 426/243

[56] References Cited

U.S. PATENT DOCUMENTS

| | | | |
|---|---|---|---|
| 1,033,860 | 7/1912 | Barnes | 426/617 |
| 1,397,187 | 11/1921 | Tucker | 426/632 |
| 2,510,534 | 6/1950 | Whitehead | 426/632 |
| 4,466,987 | 8/1984 | Wilkins | 426/632 |

*Primary Examiner*—Steven Weinstein
*Assistant Examiner*—Helen Pratt
*Attorney, Agent, or Firm*—Needle & Rosenberg

[57] ABSTRACT

A peanut food having the texture of a parched peanut and the taste of a boiled nut is produced by sequentially soaking the peanut in shell in water, boiling the peanut along with an amount of coconut, and microwaving the peanut. Upon cooling, the peanut hardens, yet retains the taste produced in boiling.

5 Claims, No Drawings

PROCESSED PEANUTS AND METHOD OF PRODUCING THE SAME

BACKGROUND OF THE INVENTION

This invention relates to peanut products, and more particularly, to a method of producing a peanut having the taste of a boiled peanut with the physical characteristics of a parched peanut.

Peanuts are a popular and nutritious food, having a large proportion of protein and other nutrients. For example, peanuts contain relatively high amounts of calcium, sodium and potassium, as well as lesser amounts of iron, niacin, riboflavin and thiamine. Also, in many sections of the world, peanuts are an important cash crop.

Two traditional ways of cooking peanuts are boiling and parching. A problem exists, however, in that neither method produces the ideal nut in both taste and texture. A boiled peanut, while having the rich, earthy taste one looks for in a peanut, is soft in texture. As such, it does not stay fresh very long and is difficult to package. For example, boiled peanuts must be canned to have a long shelf life. A parched peanut, on the other hand, is crunchy and, while it is more easily packaged than the boiled nut and while many people prefer crunchy peanuts to soft peanuts, the parched nut lacks a rich, earthy taste. Variations of parching has been attempted to produce a better tasting nut, i.e. "dry roasting", but none have succeeded in capturing the taste of the boiled peanut.

There exists, therefore, a need for a method of producing a peanut having the texture of a parched peanut and the taste of a boiled peanut.

There also is a need for a method of producing a peanut having the taste of a boiled nut but which can be conveniently packaged in a cellophane or similarly styled package.

SUMMARY OF THE INVENTION

The present invention relates to a peanut product and a method for producing the same wherein the peanut has the taste of a boiled peanut, but which also has the physical attributes of a parched peanut.

The peanuts, still in the shell, are soaked in fresh water for approximately four hours. They are then transferred to fresh cold water, where salt and shredded coconut are also added. The water is boiled for approximately forty minutes, whereafter the peanuts are removed from the water and drained. The peanuts are then cooked in a microwave oven for approximately twenty minutes, and then removed and cooled. While the peanut will have the appearance and feel of a boiled nut upon removal from the microwave, after cooling they become similar in texture to a parched nut. The peanut is then shelled and ready for packaging.

The object of this invention, then, is to provide a nut having a hard texture, and therefore, is crunchy when eaten, and which simultaneously has the preferred taste of a boiled nut.

It is also an object of this invention to provide a nut which can be effectively packaged in cellophane or like-packages and which still has the taste characteristics of a boiled nut.

These and other advantages will be apparent from the following detailed description of the invention.

DETAILED DESCRIPTION OF THE INVENTION

For simplicity sake, the method of the present invention will be described on a per pound of peanuts basis. However, larger scale production of the peanut product described herein is, of course, possible.

When choosing peanuts, it is recommended that one select those with clean, firm shells which are free of cracks or crushed portions. One should also avoid peanuts having a dry loose rattle, since they are likely stale.

As a first step, the pound of peanuts, still in the shells, are soaked in cold water for approximately four hours. This procedure serves to clean the peanuts, and softens the nut in preparation of the following steps.

After the peanuts are removed from the first soaking, they are placed in approximately a gallon to a gallon and one quarter of fresh, cold water. In this step, cold water is preferable in that, unlike warm or hot water, it inhibits the build up of unwanted white salt on the shell on the outside of the nut. Also added to the water is approximately one-third of a cup of table salt and approximately one cup of shredded coconut. The water is then boiled for approximately thirty-five to forty minutes. It is important to note that the coconut helps the boiled nut to maintain its rich, earthy flavor. It is noted that more than a pound of peanuts may be used per one to one and a quarter gallons of water, however, one pound is preferred.

Upon completion of the boiling time, the peanuts are removed from the water and left to drain. Once drained, they are placed one layer deep into a microwave oven, where they are cooked for approximately twenty to twenty-five minutes. If a standard microwave oven is used, the temperature setting should be between medium and high power, preferably three-quarter power. However, time and temperature may be varied according to the type of microwave oven used.

Upon expiration of the microwave cooking time, the peanuts are removed and set to cool. After cooling, the shell is removed from the peanut.

Upon first removal from the microwave oven, the peanut has the appearance of a typical boiled peanut. However, as the peanut is cooled, the inner nut gradually becomes hard in texture, similar to a parched nut. However, the nut retains the taste of a boiled nut.

Therefore, a combination of a crunchy textured nut and boiled peanut taste is achieved. Such a nut can be packaged in a cellophane or like material package, and therefore, has a longer shelf life than the similarly tasting boiled peanut. Additionally, because the process utilized cold water as a starting point, salt remains in the peanut rather than becoming a residue outside of the nut.

I claim:

1. A method of processing peanuts comprising the steps of:
   (a) soaking, for each pound of peanuts, said peanuts in a first water for approximately four hours while said peanuts are still in their shells;
   (b) transferring said soaked peanuts to approximately one gallon to one and one quarter gallons of cold second water;
   (c) adding approximately one cup of shredded coconut to said cold second water;
   (d) boiling said cold second water containing said peanuts and said shredded coconut for approximately thirty-five to forty minutes;

(e) removing said boiled peanuts from said second water;
(f) applying microwave energy to said boiled peanuts in a microwave oven until said peanuts are dried; and
(g) cooling said microwaved peanuts 2. The method of claim 1, and further comprising the step of adding about ⅛ cup of salt to said cold second water prior to said boiling step.

3. The method of claim 1, wherein the time for applying said microwave energy ranges from twenty to twenty-five minutes.

4. The method of claim 1, wherein said peanuts in shell are set one layer thick when microwaved.

5. Processed peanuts having the taste of boiled peanuts with the crunchy texture characteristics of a parched peanuts produced by the method of claim 1.

* * * * *